(12) United States Patent
Moyer et al.

(10) Patent No.: US 6,895,530 B2
(45) Date of Patent: May 17, 2005

(54) METHOD AND APPARATUS FOR CONTROLLING A DATA PROCESSING SYSTEM DURING DEBUG

(75) Inventors: William C. Moyer, Dripping Springs, TX (US); John Kelley, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 133 days.

(21) Appl. No.: 10/350,658

(22) Filed: Jan. 24, 2003

(65) Prior Publication Data

US 2004/0148548 A1 Jul. 29, 2004

(51) Int. Cl.[7] .............................................. G06F 11/00
(52) U.S. Cl. ........................................ 714/25; 714/27
(58) Field of Search .............................. 714/25, 27, 30, 714/31, 32, 727, 38

(56) References Cited

U.S. PATENT DOCUMENTS

| | | | | |
|---|---|---|---|---|
| 5,680,620 A | * | 10/1997 | Ross ........................... | 717/129 |
| 5,754,759 A | * | 5/1998 | Clarke et al. .................. | 714/37 |
| 5,828,824 A | | 10/1998 | Swoboda | |
| 5,889,988 A | * | 3/1999 | Held ........................... | 718/103 |
| 6,026,503 A | * | 2/2000 | Gutgold et al. ............... | 714/45 |
| 6,122,756 A | * | 9/2000 | Baxter et al. ................. | 714/30 |
| 6,279,123 B1 | * | 8/2001 | Mulrooney ................... | 714/35 |
| 6,446,221 B1 | * | 9/2002 | Jaggar et al. ................. | 714/30 |
| 6,598,180 B1 | * | 7/2003 | Dryfoos et al. ............... | 714/38 |
| 6,732,311 B1 | * | 5/2004 | Fischer et al. .............. | 714/737 |
| 2002/0087918 A1 | * | 7/2002 | Miura et al. .................. | 714/38 |
| 2002/0116081 A1 | * | 8/2002 | Wood et al. .................. | 700/87 |
| 2002/0144235 A1 | * | 10/2002 | Simmers et al. ............. | 717/124 |

FOREIGN PATENT DOCUMENTS

WO    WO 01/37106 A1    5/2001

OTHER PUBLICATIONS

"Redcap Digital Signal Processor Integrated with MCU, Product Specifications Revision 1.099," *Motorola Semiconductor Israel Ltd.*, Jun. 12, 1996.

* cited by examiner

*Primary Examiner*—Robert Beausoliel
*Assistant Examiner*—Christopher McCarthy
(74) *Attorney, Agent, or Firm*—Joanna G. Chiu; Susan C. Hill

(57) ABSTRACT

A data processing system (10) includes a debug unit (14) that is capable of providing unobtrusive debug capabilities to the normal operation of the data processing system by controlling activation of all or a selected subset of a plurality of subsystems as needed for a debug operation. For example, power can be conserved by activating selected subsystems as needed for a debug operation. Furthermore, in one embodiment, the debug unit provides a level of activation, ranging from deactivation to full activation, to the selected subsystems which provides further control of the data processing system. In one embodiment, debug control and status registers (40) are provided for power management handshaking between the debug unit and the plurality of subsystems. The handshaking can be used to ensure that a debug operation may proceed properly since the selected subsystems are capable of providing status information to the debug unit.

17 Claims, 2 Drawing Sheets

METHOD AND APPARATUS FOR CONTROLLING A DATA PROCESSING SYSTEM DURING DEBUG

FIELD OF THE INVENTION

The present invention relates generally to data processing systems and debugging, and more specifically, to control of a data processing system during debug.

RELATED ART

Debug systems are utilized in many data processing systems, such as in system on chips (SoCs), to provide access and visibility of system components. These debug systems may therefore be used to detect and correct defects within data processing systems. However, many debug systems that are currently available today are overly obtrusive in that they dramatically affect the system state of the data processing system which reduces the ability to accurately debug the system. Furthermore, some debug systems also require full power-up of the data processing system for performing debug operations. However, portions of the data processing system may be unnecessarily powered up during this full power-up, thus increasing power consumption unnecessarily. Therefore, a need exists for a less obtrusive power-aware debug system.

BRIEF DESCRIPTION OF THE DRAWINGS

The present invention is illustrated by way of example and not limited by the accompanying figures, in which like references indicate similar elements, and in which.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION OF THE DRAWINGS

As used herein, the term "bus" is used to refer to a plurality of signals or conductors which may be used to transfer one or more various types of information, such as data, addresses, control, or status. The conductors (or signals) as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time-multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Figure 1:
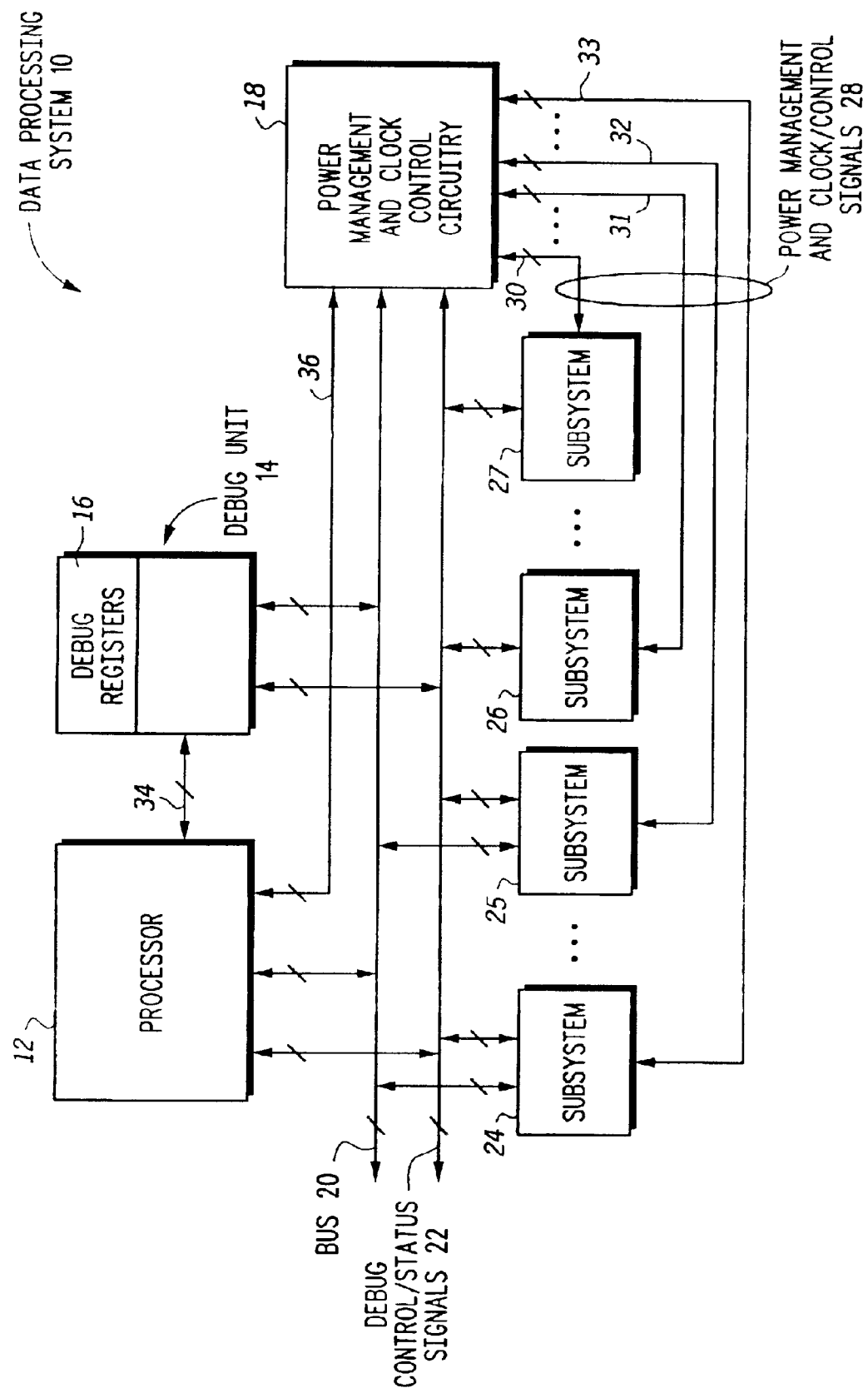
FIG. 1 illustrates, in block diagram form, a data processing system in accordance with one embodiment of the present invention.

FIG. 1 illustrates a data processing system 10 in accordance with one embodiment of the present invention. Data processing system 10 includes a processor 12, debug unit 14, power management and clock control circuitry 18, and subsystems 24–27. Processor 12, debug unit 14, power management and clock control circuitry 18, and subsystems 24, 25 are bidirectionally coupled to each other via bus 20. Also, debug unit 14 sends and receives debug control/status signals 22 to and from each of processor 12, subsystems 24–27, and power management and clock control circuitry 18. Power management and clock control circuitry 18 provide power management and clock/control signals 28 to each of subsystems 24–27 via bidirectional conductors 30, 31, 32, and 33, respectively. Processor 12 is also bidirectionally coupled to power management and clock control circuitry 18 via conductors 36.

Debug unit 14 provides the ability to debug data processing system 10. Debug unit 14 is capable of providing unobtrusive debug capabilities to the normal operation of data processing system 10 by controlling a level of activation of all or a subset of subsystems 24–27 as needed for a debug operation. Unlike prior art systems, embodiments of the present invention are able to control a level of activation of subsystems 24–27 during debug without requiring any change of the operating mode of data processing system 10. This is desirable because during debug, minimal changes to data processing system 10 are desired in order to provide more accurate debugging. A change in the operating mode of the data processing system may result in less accurate debug information because in an actual application of data processing system 10, it will not be operating in a debug mode. Therefore, to get more accurate debug information, the data processing system during debug should operate as closely as possible to the operating mode used in the actual application.

In one embodiment, data processing system 10 is a low power SoC which may be used, for example, in hand-held devices (such as in wireless applications). Alternatively, data processing system 10 can be any type of data processing system having multiple subsystems, as illustrated in FIG. 1. Data processing system 10 includes subsystems 24–27 where subsystems 24, 25 are two subsystems of a plurality of subsystems which may be coupled to bus 20 and capable of sending and receiving debug control and status signals to and from debug unit 14, and where subsystems 26, 27 are two subsystems of a plurality of subsystems which may not be coupled to bus 20 but are still capable of sending and receiving debug control and status signals to and from debug unit 14. Although only four subsystems are illustrated, data processing system 10 may include any number (including one or zero) of subsystems such as subsystems 24, 25 and any number (including one or zero) of subsystems such as subsystems 26, 27.

Generally, each of subsystems 24–27 are portions of data processing system 10. Each of these subsystems 24–27 may have different clock domains or power domains in which clocks and/or power supplies (and/or other attributes) may be independently controlled in order to, for example, lower overall system power consumption. Note that some of the subsystems may also share clock or power domains. Each of these subsystems may therefore include different portions of data processing system 10 such as other controllers, peripherals, input/output (I/O) devices, I/O interfaces, other processors such as a digital signal processor (DSP), etc. Therefore, data processing system 10 may include various different types of master and slave devices, and be grouped into different subsystems, where the subsystems or portions of the subsystems may overlap. Furthermore, note that each of processor 12, debug unit 14, and power management and clock control circuitry 18 may be considered a subsystem, or may be included as a portion of a subsystem. Also, note that in alternate embodiments, data processing system 10 may be organized differently. For example, debug unit 14 may be located within processor 12 or power management and clock control circuitry 18, and power management and clock control circuitry 18 may be located within processor 12 or may be distributed among some or all of processor 12 or subsystems 24–27. Furthermore, portions or all of debug unit 14 may be located outside of data processing system 10 (such as in an off chip location). Therefore, as can be appreciated, data processing system 10 may be designed and partitioned into different subsystems in a variety of different ways.

Figure 2:
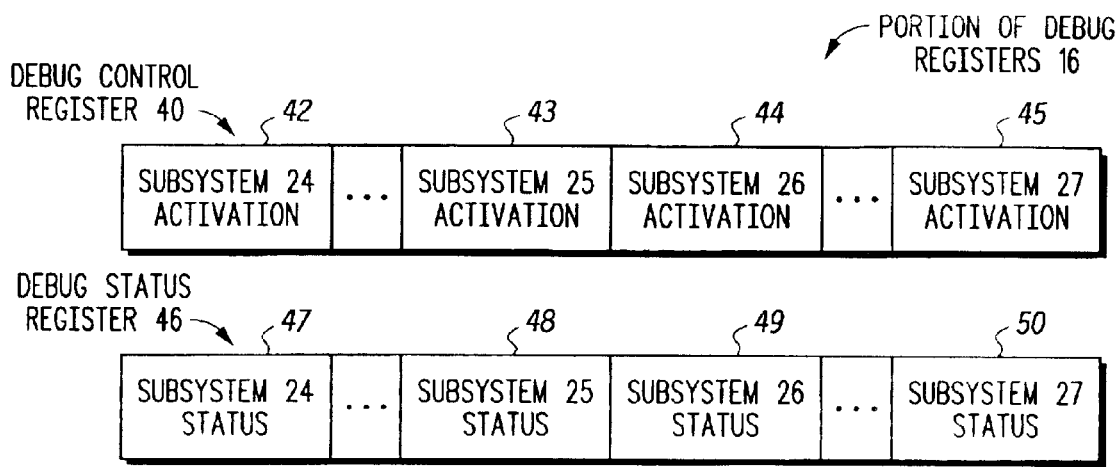
FIG. 2 illustrates debug control and status registers of the data processing system of FIG. 1 in accordance with one embodiment of the present invention.
Figure 3:
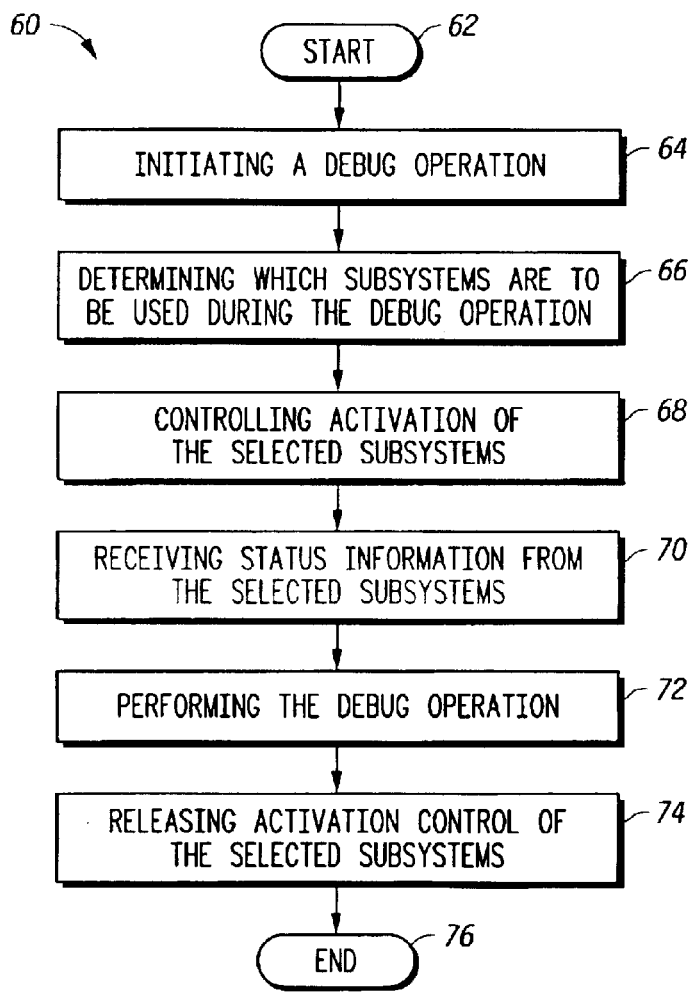
FIG. 3 illustrates, in flow diagram form, a method of controlling the data processing system of FIG. 1 during debug in accordance with one embodiment of the present invention.

Note that normal operation (outside of debug) of data processing system 10 may function as generally known in the art and therefore will only be described to the extent needed to better understand the descriptions of FIGS. 1–3. Also, note that the blocks illustrated in FIG. 1 may be arranged in a variety of different ways where some portions may even be located outside of data processing system 10. Also, each of the blocks illustrated in FIG. 1, such as, for example, debug unit 14 and power management and clock control circuitry 18, may be implemented in software, hardware, firmware, or any combination thereof.

As described above, subsystems 24–27 may be controlled in a variety of different ways. For example, each of the subsystems 24–27 may be independently powered down by gating-off or disabling their clocks, by reducing or removing supply voltages, or by modifying the frequency of their clocks. That is, a variety of different subsystem attributes (such as clock or power attributes or power usage) may be independently controlled in a variety of ways. Therefore power management and clock control circuitry 18 may be used to either provide control signals to each of the subsystems to control any of these functions or attributes, or may provide actual clock signals to any of these subsystems. Power management and clock/control signals 28 may therefore include control signals, clocks, or any other type of information that may be needed for power management and activation control (as will be discussed below) of subsystems 24–27.

The level of activation of a subsystem may be controlled in various different ways. In one embodiment, each subsystem may only have two possible level of activations: activated and deactivated (or inactive). In this embodiment, activating a subsystem may refer to enabling its clocks, increasing the clock frequency, or providing a supply voltage to the subsystem while deactivating a subsystem may refer to gating-off or disabling clocks, removing supply voltage entirely, or reducing clock frequency. Alternatively, each subsystem may have more levels of activations. For example, controlling a level of activation of a subsystem may include providing a particular supply voltage, or providing a particular clock frequency, or placing the subsystem into full power, reduced power, or low power, or some other mode of operation. Therefore, various different embodiments of debug unit 14 may provide different activation control.

In one embodiment, debug unit 14 includes debug registers 16, which, as illustrated in FIG. 2, includes a debug control register 40 and a debug status register 46. These registers provide for power management handshaking between debug unit 14 and subsystems 24–27. Debug control register 40 is used to control activation of the selected subsystems for a debug operation. Debug status register 46 is used to indicate the status of subsystems 24–27. Debug unit 14 can then use the status information in order to ascertain when it may continue with a debug operation involving the selected subsystems. Also note that in alternate embodiments, debug register 16 may include any number of registers, as needed, and be included anywhere within data processing system 10.

As illustrated in FIG. 2, debug control register 40 includes a field 42–45 which corresponds to each subsystem 24–27, respectively. Therefore, subsystem 24 activation field 42 corresponds to subsystem 24, subsystem 25 activation field 43 corresponds to subsystem 25, subsystem 26 activation field 44 corresponds to subsystem 26, and subsystem 27 activation field 45 corresponds to subsystem 27. Each activation field 42–45 may be a single bit value where one state of the bit indicates that the corresponding subsystem is to be activated and the other state of the bit indicates that the corresponding subsystem is not to be activated unless already activated, (or alternatively indicates that the corresponding subsystem is to be deactivated). Alternatively, each activation field may be an n-bit value which provides a level of activation for the corresponding subsystem. For example, a 2-bit value may be used which provides up to 4 different levels of activation for each subsystem, ranging, for example, from deactivated to partial activation to full activation. Alternatively, a one-bit value may be used to indicate a predetermined increase or decrease in a level of activation. Furthermore, note that each activation field may correspond to different attributes of a subsystem. For example, subsystem 24 activation field 42 may be used to control one type of clock attribute while subsystem 25 activation field 43 may be used to control a different type of clock attribute, a power attribute, or any other type of subsystem attribute. Also, in an alternate embodiment, multiple subsystems may share a single debug activation field.

Still referring to FIG. 2, debug status register 46 includes a field 47–50 which corresponds to each subsystem 24–27, respectively. Therefore, subsystem 24 status field 47 corresponds to subsystem 24, subsystem 25 status field 48 corresponds to subsystem 25, subsystem 26 status field 49 corresponds to subsystem 26, and subsystem 27 status field 50 corresponds to subsystem 27. Each status field 47–50 may be a single bit value where one state of the bit indicates that the corresponding subsystem is active and the other state of the bit indicates that the corresponding subsystem is inactive. Alternatively, each status field may be an n-bit value which indicates a current level of activation of the corresponding subsystem. Also, in an alternate embodiment, different subsystems may share a single debug status field. Alternatively, some subsystems may not require a debug status field at all because they may not need to communicate status information to debug unit 14.

FIG. 3 includes a flow 60 which illustrates a method of controlling data processing system 10 during a debug operation. Flow 60 begins with start 62 and proceeds to block 64 where a debug operation is initiated. Flow then proceeds to block 66 where debug unit 14 determines which subsystems are to be used during the debug operation. In one embodiment, debug unit 14 uses a look-up table to determine this information where the look-up table includes a list of debug operations and the corresponding subsystems needed for each debug operation. Also note that determining which subsystems are to be used may also include determining what level of activation is needed for each subsystem in order to perform the particular debug operation. For example, in an alternate embodiment, for each debug operation in the look-up table, a level of activation can be stored for each needed subsystem for the corresponding debug information. These level of activation values may therefore correspond to the values that are to be stored in debug control register 40. Therefore, in this manner, different subsystems can have different levels of activations (in which different attributes may be controlled) depending on the particular debug operation being performed. Alternatively, other systems other than or in addition to a look-up table may be used to determine which subsystems are to be used. For example, an intelligent software determination or state-machine based method may be used.

Debug unit 14 uses the information from the look-up table (or other system which provides the appropriate level of activation for the selected subsystems) and writes the appropriate values to debug control register 40. That is, for each selected subsystem, an appropriate value corresponding to the appropriate level of activation is stored in the corresponding activation field. For example, in the embodiment described above where the determination method uses a look-up table which provides the needed subsystems for each debug operation, a same predetermined value may be written to each activation field (in debug control register 40) corresponding to a needed subsystem in order to activate the needed subsystems. Alternatively, if the list also provides level of activation values for each needed subsystem, then these values may be written to debug control register 40. (Note that, in one embodiment, any remaining activation fields corresponding to the non-selected subsystems remain unaffected for the current debug operation. Alternatively, they can be cleared or written to a predetermined value.)

Flow then proceeds to block 68 where activation of the selected subsystems is controlled. In one embodiment, the values in debug control register 40 are provided to power management and clock control circuitry 18 so that the appropriate control signals or clock signals can be provided to the appropriate subsystems to achieve the desired level of activation according to debug control register 40. Alternatively, debug unit 14 may provide the values stored in the activation fields of debug control register 40 directly to each corresponding subsystem in addition to or in place of sending the values to power management and clock control circuitry 18.

Note that in one embodiment, debug unit 14 may be used to activate only those subsystems which are to be used during the debug operation. Alternatively, debug unit 14 may activate more subsystems, or may also deactivate or modify the level of activation of any subsystem. In some cases, note that the level of activation provided to a selected subsystem for a debug operation may be the same as the current level of activation of the selected subsystem, meaning no change in activation level is required. Alternatively, if the level of activation provided to a selected subsystem for a debug operation is less than the current level of activation, then some embodiments may choose not to change the activation level in this situation.

As mentioned above, debug unit 14 can be implemented in a variety of different ways, where, in one example, portions are located both inside and outside of data processing system 10. In one example, the determinations of block 66 can be performed by hardware or software located outside of data processing system 10 (e.g. off-chip hardware or software) and the results can then be written to hardware inside of data processing system 10 (such as debug control register 40). In this manner, any look-up table or software determination methods can be stored outside of data processing system 10.

Flow then proceeds to block 70 where the status information from the selected subsystems is received. Each of the selected subsystems that received activation control information from debug unit 14 (and/or from power management and clock control circuitry 18) provides debug status signals (via debug control/status signals 22) to debug unit 14 which provide activation status information. Alternatively, each selected subsystem may provide debug status signals to power management and clock control circuitry 18 instead of or in addition to providing them directly to debug unit 14. If needed, power management and clock control circuitry 18 can then provide the debug status information to debug unit 14. The debug status signals provide status values which are stored into or otherwise reflected as a value in the corresponding status field of debug status register 46. In this manner, debug unit 14 can be aware of the level of activation of the selected subsystems. In one embodiment, debug unit 14 can poll debug status register 46 to determine the level of activation of the selected subsystems. Alternatively, debug unit 14 may wait a predetermined amount of time before reading debug status register 46 to allow for propagation delays.

Once the status information is received, flow can proceed to block 72 where the debug operation is performed with the appropriate subsystems set to the appropriate activation levels. Note that in one embodiment, the status information indicates that the corresponding subsystem is now operating at the correct level of activation. However, in an alternate embodiment, the status information can indicate the corresponding subsystem is in the process of entering the correct level of activation. In this embodiment, debug unit 14 can wait a predetermined amount of time prior to performing the debug operation to ensure that the subsystems are at the appropriate level of activation. Also, debug unit 14 may use the information in debug status register 46 to determine whether any of the selected subsystems failed to enter the correct level of activation. Also, software located inside or outside of data processing system 10 may read the status information from debug status register 46 and compare the results to expected results to help determine proper operation of the activation control.

After the debug operation is complete, flow proceeds to block 74 where debug unit 14 releases activation control of the selected subsystem. In one embodiment, upon release of activation control, the selected subsystems return to the level of activation they were in prior to the debug operation. For example, if a particular selected subsystem was in a low power mode prior to the debug operation, but had to be activated for the debug operation (such as by being providing a supply power or having its clocks enabled), the particular selected subsystem would automatically return to the low power mode upon release of the activation control by debug unit 14. In one embodiment, debug unit 14 releases activation control by clearing the corresponding fields in debug control register 40. In an alternate embodiment, debug unit 14 releases activation by restoring a predetermined value in the corresponding fields in debug control register 40. Alternatively, upon release of the activation control, the selected subsystems may return to a default mode or level of activation. Flow then ends at 76.

Note that in alternate embodiments, blocks 70 and 74 are optional. For example, in one embodiment, block 70 is not present where debug unit 14 does not receive feedback as to status information from the selected subsystems. In this embodiment, after controlling activation at block 68, debug unit 14 may wait a predetermined amount of time prior to performing the debug operation at block 72. Similarly, block 74 is optional, in that debug circuitry 14 does not need to actively release activation control. For example, activation control can be released or addressed using other methods upon finishing the debug operation.

It can be appreciated how the closed-loop operation in flow 60 involving handshaking control and status information ensures that the debug operation may proceed properly, since the required subsystems are known to be active prior to issuing the debug command. Also, power can be conserved by activating only a subset of the subsystems as needed for a debug operation during low power modes without having to power up the entire data processing system. Also, as discussed above, flow 60 does not require a change in the operating mode of data processing system 10. That is, through the use of subsystem activation control, the embodiments described herein provide debug capabilities without requiring a change in the operating mode of the data processing system and provide the ability to reduce power consumption during debug, thus achieving improved and more accurate debugging.

In the foregoing specification, the invention has been described with reference to specific embodiments. However, one of ordinary skill in the art appreciates that various modifications and changes can be made without departing from the scope of the present invention as set forth in the claims below. For example, the block diagrams may different blocks than those illustrated and may have more or less blocks or be arranged differently. Also, the flow diagrams may also be arranged differently, include more or less steps, be arranged differently, or may have steps that can be separated into multiple steps or steps that can be performed simultaneously with one another. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for controlling a data processing system during a debug operation, the data processing system having a plurality of subsystems, the method comprising:

selecting selected ones of the plurality of subsystems which are to be activated during the debug operation;

controlling activation of the selected ones of the plurality of subsystems without changing an operating mode of the data processing system, wherein controlling activation comprises at least one of changing an attribute of a clock or initiating a change in power consumption;

providing activation status information from the selected ones of the plurality of subsystems; and performing the debug operation.

2. A method as in claim 1, further comprising:

releasing activation control of the selected ones of the plurality of subsystems.

3. A method as in claim 1, further comprising:

determining which of the plurality of subsystems must be the selected ones in order to perform the debug operation.

4. A method as in claim 1, further comprising:

selectively pausing the debug operation based upon the activation status information.

5. A method as in claim 1, wherein the step of selecting comprises:

writing activation control information to a debug control register.

6. A data processing system, comprising:

a plurality of subsystems; and means for performing a debug operation, comprising:

means for selecting which of the plurality of subsystems are to be activated during the debug operation; and means for individually controlling activation of each of the plurality of subsystems during the debug operation, wherein an operating mode of the data processing system is unchanged by activation, wherein the means for individually controlling activation of each of the plurality of subsystems comprises at least one of means for changing an attribute of a clock provided to at least one of the plurality of subsystems or means for changing power usage of at least one of the plurality of subsystems.

7. A data processing system as in claim 6, wherein the means for performing the debug operation further comprises:

means for receiving activation status information from at least one of the plurality of subsystems.

8. A data processing system as in claim 7, wherein the means for receiving activation status information comprises:

at least one status register field for each of the at least one of the plurality of subsystems.

9. A data processing system as in claim 7, wherein the debug operation is selectively paused based upon the activation status information.

10. A data processing system as in claim 6, wherein the means for selecting comprises:

at least one control register field for at least one of the plurality of subsystems.

11. A data processing system as in claim 6, wherein the means for selecting which of the plurality of subsystems are to be activated during the debug operation also comprises means for determining a level of activation.

12. A data processing system as in claim 6, wherein the means for individually controlling activation of each of the plurality of subsystems comprises means for changing frequency of a clock provided to at least one of the plurality of subsystems.

13. A data processing system as in claim 6, wherein the means for individually controlling activation of each of the plurality of subsystems activates only those ones of the plurality of subsystems which are required to perform the debug operation.

14. A data processing system as in claim 6, wherein the means for individually controlling activation releases each of the plurality of subsystems to a state of activation which each of the plurality of subsystems had before initiation of the debug operation.

15. A data processing system, comprising:
   a first subsystem;
   a second subsystem; and
   a debug unit for performing a debug operation, comprising:
      a first control register field which stores first activation control information corresponding to at least one of a power attribute or a clock attribute for the debug operation for the first subsystem;
      a second control register field which stores second activation control information corresponding to at least one of a power attribute or a clock attribute for the debug operation for the second subsystem;
      a first status register field which indicates first activation status information for the debug operation for the first subsystem; and
      a second status register field which indicates second activation status information for the debug operation for the second subsystem.

16. A data processing system, comprising:
   a first subsystem;
   a second subsystem; and
   circuitry which provides first activation control information corresponding to at least one of a power attribute or a clock attribute for a debug operation to the first subsystem and which provides second activation control information corresponding to at least one of a power attribute or a clock attribute for the debug operation to the second subsystem, wherein the first activation control information and the second activation control information produce a different response in the first and second subsystems, and wherein the first and second activation control information do not request the data processing system to change an operating mode.

17. A data processing system, comprising:
   a first subsystem;
   a second subsystem; and
   circuitry which provides first activation control information corresponding to at least one of a power attribute or a clock attribute for a debug operation to the first subsystem and which provides second activation control information corresponding to at least one of a power attribute or a clock attribute for the debug operation to the second subsystem, wherein the circuitry receives first activation status information in response to providing the first activation control information and receives second activation status information in response to providing the second activation control information, wherein the first activation status information indicates a level of activation of the first subsystem and the second activation status information indicates a level of activation of the second subsystem.

* * * * *